Sept. 11, 1956     H. MARKE     2,762,154
TIP FOR FISHING ROD
Filed April 26, 1952
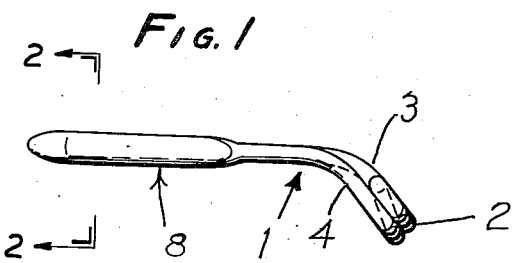
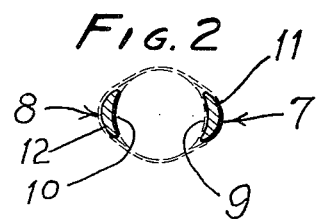
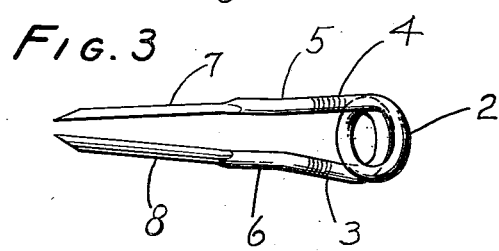
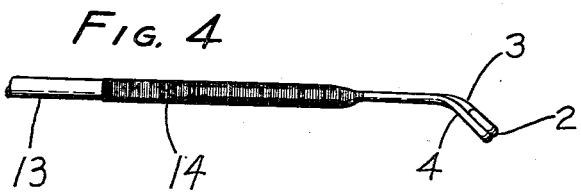
INVENTOR.
HANS MARKE
BY
ATTORNEY.

United States Patent Office 2,762,154
Patented Sept. 11, 1956

2,762,154

TIP FOR FISHING ROD

Hans Marke, Burbank, Calif., assignor to Aetna Products & Manufacturing Co., Burbank, Calif., a corporation of California Application April 26, 1952, Serial No. 284,489

5 Claims. (Cl. 43—24)

This invention relates to fishing rod guides and has for its principal object to provide a guide of a simple construction which is adapted to be readily fitted to fishing rods of a number of different sizes.

A fishing rod is commonly constructed with a number of metal line guides along its length between the reel or butt end and the relatively thin flexible tip end. The tip end is provided with a metal tip-top having an eye opening aligned with the eyes or openings of the line guides so that the line can extend substantially straight from the reel through the line guide openings to the tip-top opening. The term "guide" as used in the present specification and claims covers broadly these devices for guiding the line, namely, line guides and tip-tops. The tip-tops have commonly comprised an eye portion attached to a hollow shank which is substantially cylindrical in shape so that each can be fitted over the end of the flexible tip section of a rod and held in place by suitable sealing material such as glue or a sealing wax or the like. A disadvantage of such a shank construction is that a metal tip having a given shank can be fitted to only one tip end rod size; and this requires that metal tip-tops of many different sizes be provided for the many different rod sizes.

In accordance with my present invention I avoid the disadvantages of the previously used types of metal tip-tops by the provision of a tip-top or guide which can be readily fitted to the end of fishing rods having a considerable range of rod sizes. My novel guide is made of a resilient wire-like material comprising both the eye member and its support. The eye portion is formed of a coil or convolution the ends of which are brought down to footings adapted to be bound along the end of the flexible rod member.

The foregoing and other features of my invention will be better understood from the following detailed description and the accompanying drawing, of which:

Fig. 1 shows a side view of a tip in accordance with my invention;

Fig. 2 is a cross section view taken at line 2—2 of Fig. 1;

Fig. 3 is a top plan view of the tip; and

Fig. 4 illustrates a side view of the tip bound on the end of a flexible fishing rod.

Referring to the drawing, the guide in the form of a tip-top is made of a resilient wire or wire-like material, such as spring tempered metal, which is preferably Monel metal, or at least some metal which does not rust; and is provided with a circular coil 2 which may be of about one and one-half turns preferably placed closely together. It will be understood, however, that more than one or two convolutions or loops could be used in the coil if desired. The ends of the coil are brought out as legs 3 and 4 almost parallel but somewhat converging toward each other and they lie in substantially the same plane and at an angle to the longitudinal axis of the coil as shown in Figs. 1 and 4. Adjacent the place on the rod on which the guide is to be mounted, the legs are bent at 5 and 6 to become aligned with the axis of the rod. The free extremities of the legs are formed into respective footings 7 and 8, which normally converge toward each other as shown in Fig. 3. Preferably the insides of the footings are formed into partial cylindrical surfaces 9 and 10 in order that they may more readily fit the rounded exterior of the fishing rod. Furthermore the outer surfaces of the footings 7 and 8 are similarly made rounded or cylindrical at 11 and 12 so that a binding may readily be applied.

Fig. 4 illustrates the tip-top applied to the end 13 of a fish rod and for this purpose the footings 7 and 8 are sprung apart sufficiently to receive the substantially cylindrical end of a fish rod which extends approximately to a point where the footing members 7 and 8 merge into the portions 5 and 6. As thus placed, a binding thread 14 is wrapped around the footings and the rod as shown in Fig. 4; and in accordance with a common practice a varnish may be applied over the binding.

From the foregoing description it will readily be understood that by my novel guide there is provided an arrangement which can readily be applied to the end of a fish rod and furthermore that the same tip-top can be applied to a number of sizes of rod diameters. Owing to the resilience of the portions 3, 4, 5 and 6 which normally converge somewhat toward each other, the footings 7 and 8 may be sprung apart from their normal position to a considerable extent. Thus, the footings can readily be applied to relatively small diameter rods such that the portions 3, 4, 5 and 6 may continue to converge toward each other or on the other hand they may be applied to a larger diameter rod such that the portions 3 and 4 are made substantially parallel to each other or even perhaps a trifle beyond parallel.

While the guides of my present invention are illustrated as being placed at the tips of the fishing rods, it will be recognized that the parallel resilient legs are adapted to be mounted at any position along the length of a fishing rod for guiding the line.

I claim:

1. A fishing rod guide consisting of a wire coil, the free ends of which converge toward each other, said ends constituting footings adapted to be fitted to opposite sides of a fishing rod.

2. A fishing rod guide consisting of a wire coil, said coil being of more than a single convolution, the free ends of said wire coil comprising legs converging toward each other in a plane arranged at an angle with the longitudinal axis through the coil, said legs having bent portions adapted to form footings which normally converge toward each other, said footings being adapted to be spung away from each other over opposite sides of a fishing rod.

3. A fishing rod guide according to claim 2 in which the insides of the footings are rounded to conform with the exterior surface of a fish rod.

4. A fishing rod guide according to claim 2 in which both the inside and outside surfaces of the footings are rounded so that said inside surface conforms substantially with the exterior surface of a fish rod and the outside surface enables a binding to be applied around the rod and the footings.

5. A fishing rod guide according to claim 2 in which the number of convolutions in the coil is substantially one and one-half.

References Cited in the file of this patent

UNITED STATES PATENTS

| | | |
|---|---|---|
| 1,465,656 | Swan | Aug. 21, 1923 |
| 1,716,254 | Walton | June 4, 1929 |
| 1,844,044 | Pflueger | Feb. 9, 1932 |
| 2,328,541 | Bachlotte | Sept. 7, 1943 |
| 2,573,647 | Marke | Oct. 30, 1951 |

OTHER REFERENCES

Mildrum Fishing Rod Mountings, Catalogue No. 11 (1500-SP-8-50), of the W. W. Mildrum Jewel Co., of East Berlin, Conn., page 16, the Mildarbide Big Game Fishing Guide.